June 17, 1952  A. C. CROSS  2,600,854
LEVELER ATTACHMENT FOR DISK HARROWS
Filed Jan. 22, 1946

Inventor
Alvin C. Cross,

By
Attorneys

Patented June 17, 1952

2,600,854

UNITED STATES PATENT OFFICE 2,600,854

LEVELER ATTACHMENT FOR DISK HARROWS

Alvin C. Cross, Lamar, Nebr.

Application January 22, 1946, Serial No. 642,703

3 Claims. (Cl. 55—81)

My invention relates to agricultural apparatus and more particularly to disc harrows.

The object of my invention is to provide an attachment for disc harrows adapted to close open furrows left by the disc harrow.

Another object of my invention is to provide an attachment for disc harrows adapted to level the ground worked and broken by a disc harrow to facilitate later operations over the same ground.

A further object of my invention is to provide an attachment for disc harrows which is adjustably attachable to a disc harrow and can be operated simultaneously with the disc harrow.

Other objects of my invention may appear in the following specification describing my invention with reference to the accompanying drawing illustrating a preferred embodiment of my invention. It is however, to be understood that my invention is not to be limited or restricted to the exact construction and combination of parts described in the specification and shown in the drawing but that such changes and modifications can be made which fall within the scope of the claims appended hereto.

Figure 1:
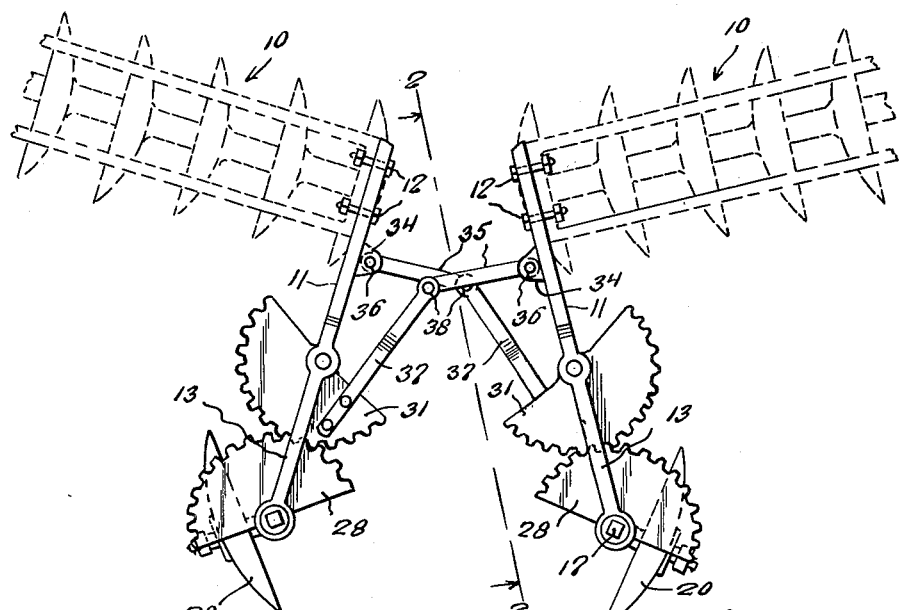
Figure 1 is a top view of the furrow leveler forming the subject matter of my invention, a disc harrow, to which the leveler is attached, being partly shown in broken lines.

Referring now in detail to the drawing, to each angularly adjustable main frame of a disc harrow 10 a bifurcated supporting arm 11 is firmly but detachably fastened by means of bolts bolts 12, so that the bifurcations 13 and 14 respectively are arranged substantially vertically over each other. Adjacent the ends of each pair of bifurcations 13 and 14 coaxial bores are provided in each of which a bushing 15 is rotatably arranged, and each bushing has a flange 16 on its inner end. The holes in the bushings are square and in each pair of bushings a square shank 17 is slidably received. The lower end of each shank 17 is round as indicated at 18 and is bent at right angles to form an axle 19 for a leveler disc 20. The leveler discs are formed and constructed like the discs of the harrow 10. To the inside surface of and concentrically with the leveler disc 20 a flanged boxing 21 is fastened which fits rotatably onto the shaft 19. By means of a U-bolt 22 a grease container 23 is fastened to the shank 17 and surrounds the boxing 21. On the outside of leveler disc 20 a boxing 24 corresponding to the inner boxing 21 is fastened and receives the end of the shaft 19. A cap 25 engages the end of the boxing 24 threadedly and has a polygonal boss 26 thereon adapted to be engaged by a tool such as a wrench or the like to fasten and unfasten it from the boxing. A cotter pin 27 extending through the shaft 19 adjacent the outer end of cap 25 prevents the latter from accidental disengagement from the boxing 24.

A semi-circular gear 28 has a hub 29 extending outwardly on both sides of the gear and fits snugly between the flanges 16 of the bushings 15. A square hole extends through the hubs 29 and slidably receives the shank 17. A set screw 30 in each hub 29 engages the shank 17 and secures it in adjusted position.

A second semi-circular gear 31 meshes with the first mentioned semi-circular gear. It has a double hub 32 and fits snugly between the bifurcations 13 and 14 and is rotatably mounted on a bolt 33 extending through the bifurcations adjacent their junction.

Figure 2:
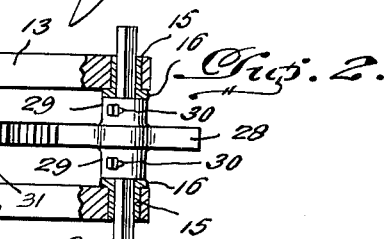
Figure 2 is a detail view of the leveler taken on line 2—2 in Figure 1 partly shown in section.
Figure 3:
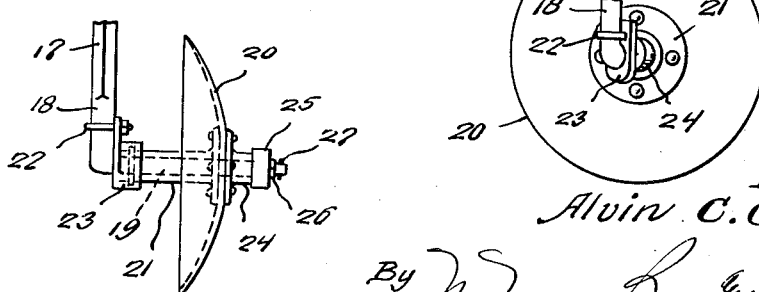
Figure 3 is a fragmentary end view of the shank and the leveler disc supported thereby.

The semi-circular gears 31 are connected by a cross-linkage to the arms 11. Each supporting arm 11 has a lug 34 thereon which supports a link 35 hingedly by means of a pin 36. A lever arm 37 is rigidly fastened to each semi-circular gear 31 by a pair of fastening members (clearly shown in Figures 1 and 2) so that it extends inwardly and forwardly when the arm 11 supporting the gear 31 is attached to the disc harrow frame. The free end of each lever arm 37 is bifurcated as shown at 38 and this bifurcation is pivotally connected with the free end of the lever 35 linked to the arm 11 on the opposite harrow frame.

It will thus be seen that pivot 38 of lever 37 will move in an arc about the center of gear 31 while link 35 will move in an arc about center 36. Hence, for any given angular position of the arm 11 the lever 37, and hence gear 31, will take an adjusted position and be restrained from movement from this position by link 35.

The foregoing description shows clearly that the leveler discs can be adjusted in relation to the depth of cutting into the ground and that they can be prevented from cutting the ground at all.

The leveler discs are, as shown and described, positioned at an angle to the harrow discs in response to the adjustment of the angular positions of the main frames 10 of the harrow so that they will work in the opposite direction to the harrow discs, thereby closing the open furrows left by the disc harrow and leveling the ground, preventing the evaporation of moisture therefrom.

Having described my invention, what I claim and desire to secure by Letters Patent is:

1. In a disc harrow, the combination with a pair of supporting arms each having an end adapted to be attached to the frames of said harrow, of a furrow leveler mounted on said arms and carried by the latter, said leveler comprising a vertically-disposed shank extending through the other end of each of said arms and rotatably carried thereby, a leveler disc arranged adjacent each of the lower ends of said shanks and operatively connected thereto for rotation about a horizontal axis, and means for rotating said shank, said means embodying a first semi-circular gear non-rotatably carried by each of said shanks, a second semi-circular gear rotatably mounted on each of said arms, said first and second-named gears being arranged in meshing engagement, and cross-linkage connecting said second gears to said arms and controlling the directions of the leveler discs in accordance with the angle between the supporting arms.

2. In a disc harrow, the combination with a pair of supporting arms each having an end adapted to be attached to the frames of said harrow, of a furrow leveler mounted on said arms and carried by the latter, said leveler comprising a vertically-disposed shank extending through the other end of each of said arms and rotatably carried thereby, a leveler disc arranged adjacent each of the lower ends of said shanks and operatively connected thereto for rotation about a horizontal axis, and means for rotating said shank, said means embodying a first semi-circular gear non-rotatably carried by each of said shanks, a second semi-circular gear rotatably mounted on each of said arms, said first and second-named gears being arranged in meshing engagement, and cross-linkage connecting said second gear to said arms, said linkage including a pair of links each having an end hingedly secured to said arms, and a lever interconnecting each of the other ends of said links with the complemental second gear, whereby the directions of the respective leveler discs are controlled in accordance with the angle between the supporting arms.

3. In a disc harrow, a pair of horizontal supporting arms disposed opposite each other and extending in substantially longitudinal directions, said supporting arms being adapted to be secured to the inner ends of the respective disc-supporting frames of the harrow, respective vertical shanks rotatably secured to the rear ends of the supporting arms, a horizontal shaft element carried by the lower end of each vertical shank, a leveler disc rotatably mounted on each horizontal shaft element, a first semi-circular gear rigidly carried by each vertical shank, a second semi-circular gear rotatably mounted on each supporting arm and meshing with the first gear carried by the vertical shank on the arm, a lever rigidly secured to each second gear and extending forwardly and inwardly therefrom, and a link bar connecting the end of each lever with the opposing horizontal supporting arm, thereby defining cross linkages controlling the directions of said horizontal shaft elements in accordance with the angle defined between said horizontal supporting arms.

ALVIN C. CROSS.

REFERENCES CITED

The following references are of record in the file of this patent:

UNITED STATES PATENTS

| Number | Name | Date |
|---|---|---|
| 333,670 | Randall | Jan. 5, 1886 |
| 411,650 | Drader | Sept. 24, 1889 |
| 528,172 | MacPhail | Oct. 3, 1894 |
| 535,075 | Parlin | Mar. 5, 1895 |
| 583,914 | Little | June 8, 1897 |
| 585,136 | Todd | June 22, 1897 |
| 623,677 | Kouns | Apr. 25, 1899 |
| 1,012,287 | Stephens | Dec. 19, 1911 |
| 1,124,703 | Clare | Jan. 12, 1915 |
| 1,253,175 | High | Jan. 8, 1918 |
| 2,171,768 | Sjogren et al. | Sept. 5, 1939 |
| 2,271,713 | Raska | Feb. 3, 1942 |